United States Patent
Kraft et al.

(10) Patent No.: US 8,451,934 B1
(45) Date of Patent: May 28, 2013

(54) METHOD AND SYSTEM FOR INCREASING THROUGHPUT OF A WIRELESS CHANNEL USING MULTIPATH TRANSMISSION

(76) Inventors: Clifford Kraft, Naperville, IL (US); Vasilios D. Dossas, Chicago, IL (US)

( * ) Notice: Subject to any disclaimer, the term of this patent is extended or adjusted under 35 U.S.C. 154(b) by 2625 days.

(21) Appl. No.: 10/230,864

(22) Filed: Aug. 28, 2002

(51) Int. Cl.
    *H03C 7/00*     (2006.01)
    *H03K 7/06*     (2006.01)
    *H04L 27/20*     (2006.01)

(52) U.S. Cl.
    USPC ........... 375/295; 375/315; 375/304; 375/301; 375/300; 375/219

(58) Field of Classification Search
    USPC ................. 375/130, 135, 136, 134, 146, 147, 375/144, 145, 148, 219, 240.02–240.03, 375/240.26–240.27, 259, 267, 278, 284, 375/285, 295, 316, 324, 340, 344, 345, 346, 375/347, 356
    See application file for complete search history.

(56) References Cited

U.S. PATENT DOCUMENTS

| | | | | |
|---|---|---|---|---|
| 6,067,313 | A * | 5/2000 | Cafarella et al. | 375/130 |
| 6,285,720 | B1 | 9/2001 | Martone | 375/262 |
| 6,430,399 | B1 * | 8/2002 | Niemela | 455/67.16 |
| 6,584,302 | B1 * | 6/2003 | Hottinen et al. | 455/69 |
| 6,621,851 | B1 * | 9/2003 | Agee et al. | 375/130 |
| 6,654,617 | B1 * | 11/2003 | Angus et al. | 455/562.1 |
| 7,016,424 | B1 * | 3/2006 | Huber et al. | 375/259 |
| 2003/0103559 | A1 * | 6/2003 | Palm | 375/222 |

OTHER PUBLICATIONS

Cherriman et al, "Turbo- and BCH-coded Wide-Band Burst-by-Burst Adaptive H.263-Assisted Wireless Video Telephony", IEEE Transactions on Circuits and Systems for Video Technology, vol. 10, No. 8, Dec. 2000, pp. 1355-1363.*
Cherriman et al, "Turbo- and BCH-coded Wide-Band Burst-by-Burst Adaptive H.263-Assisted Wireless Video Telephony", IEEE ransactions on Circuits and Systems for Video Technology, vol. 10, No. 8, Dec. 2000, pp. 1355-1363.*
"Exploiting Multipath Distortion", IEEE Spectrum Jun. 2002.
Jungiang eta. Adaptive Cochannel Interference Cancellation in Space-Time Coded Comm. Systems, IEEE Trans Comm vol. 50 # 10, Oct. 2002.
Arrendo Vector Channel Modeling and Reaction for Downlink Beamforming in Freq Division Duplex System, IEEE Trans Comm vol. 50, #0 10—Oct. 2002.
Yin Ior, "Performance of Space-Div Multiple Access (SDMA) with Scheduling " IEEE Trans Wireless Comm. vol. 1 #4 Oct. 2002.
Huang et al, "Multiple Antennas in Cellular CDMA Systems: Transmission, Detection, and Spectral Efficiency", IEEE Trans Wireless Comm. vol. 1 #3 Jul. 2002.

(Continued)

*Primary Examiner* — Sam K Ahn
*Assistant Examiner* — Linda Wong
(74) *Attorney, Agent, or Firm* — Clifford Kraft

(57) ABSTRACT

A method and system for increasing the throughput of a wireless channel that sends different data on different multipath components. The channel can be pre-mapped or dynamically mapped, and the different transmissions can be modulated by different complexity signals such as adaptive quadrature amplitude modulation (AQAM). Each multipath component is coded with a signature that will allow it to be separated at a receiver that has an omni-directional antenna. Common signature techniques can be offset PN codes, orthogonal spreading vectors, orthogonal alphabets and other signature techniques. The received channels can be combined for an overall increase in data-rate or used separate as multiplexed data.

22 Claims, 6 Drawing Sheets

OTHER PUBLICATIONS

Furió et al "Rotated TCM Systems with Dual Transmit and Multiple Receive Ants on Nakgami Fading Channels," IEEE Trans Com v. 50 #10 Oct. 2002.

Cozzo et al., "An Adaptive Rec. for Space-Time Trellis Codes Based on Per-Survivor Processing", IEEE Trans Comm, vol. 50 #8 Aug. 2002.

* cited by examiner

METHOD AND SYSTEM FOR INCREASING THROUGHPUT OF A WIRELESS CHANNEL USING MULTIPATH TRANSMISSION

BACKGROUND

1. Field of the Invention

The present invention relates generally to the field of wireless communication and more particularly to a method and apparatus for enhancing the throughput of a wireless communication system by using multipath transmission.

2. Description of the Related Art

Generally when radio waves leave a wireless radio transmitter, they spread out in all directions away from the transmitter. There is usually a direct path from the transmitting station to a receiving station. Some of the transmitted radio energy follows this direct path; however, a portion of the energy follows other paths. The phenomenon of more than one path for radio transmission between two stations is called multipath. Each path is called a multipath component. In particular, multipath is the arrival at the receiver of radio waves from the transmitter that followed various paths from the transmitter to the receiver. The reason for this effect is that radio waves reflect from numerous objects including buildings, cars, airplanes, trees and almost any other object. Thus many possible reflective paths may exist that allow a wave to leave the transmitter at some departure angle away from the direct path, reflect off of buildings, etc. and finally arrive at the receiver at a slightly delayed time from the waves following the direct path. There may be multipath components that have made several reflections before reaching the receiving station. Each different multipath component has a unique angle of departure from the transmitting antenna, a unique angle of arrival at the receiving antenna, and a unique path delay. Path delay at the speed of light is around 1 nanosecond per foot of path. Thus a radio wave arriving on a path that was 1000 feet longer than the direct path will arrive 1 microsecond later than the direct wave.

In the past, multipath has been considered a nuisance in wireless communications. The reason for this is that multipath reception many times causes deep signal fading and unwanted interference. Fading is caused when the signals along the direct path and the secondary path cancel (because the secondary path is delayed 180 degrees in phase at the transmission frequency). Interference is caused by smearing of several replicas of the transmitted signal arriving at the receiver.

It has been suggested that these problems can be overcome if the multipaths can be mapped out, and the direct path signal delayed slightly so that the multipath components arrive in phase. In fact, it is known in the art to map wireless channels between two points and provide correct delays on several multipath components to improve communication of a single signal. It is also known to use several different transmit and receive antennas between two points where the antennas use different paths. This is called space diversity, and it is known to improve communications quality. It is also known to provide different types of modulation and data coding that relies on space diversity (or so called space-time diversity) (See IEEE Spectrum, June 2002, p. 40).

It is not necessary to transmit the same signal on each of the multipath routes between a transmitting station and a receiving station. Different information can be transmitted on different pairs of transmit/receive antennas to increase the data throughput rate rather than provide space diversity. U.S. Pat. No. 6,285,720 teaches a method and apparatus for high data rate wireless communication over wavefield spaces. Here, multiple space or path channels that share the same time and frequency between the transmitter and the receiver are used to transmit different information. A different antenna and receiver front-end at the receiving location was used for each of these different paths.

The problem with this approach to increasing throughput between a transmitting and receiving station is that it requires several highly directional antennas at both the transmitting location and at the receiving location. Alternatively phased arrays or "smart antennas" can be used, but these are large, complex and expensive. One example of a wireless link is between a base station and a hand-held mobile unit (such as a cellular telephone link). In such communication systems, the hand-held unit must be small and cheap. It is almost impossible for the hand-held unit to have more than one antenna or any kind of "smart antenna" because antenna arrays are quite large. A hand-held unit's antenna is usually a vertically polarized omni-directional rod or dipole. This type of antenna combines all multipath components arriving into a single signal.

Also known in the art is the "BLAST" system developed by Lucent Technologies Bell Laboratories, and other similar systems, that transmit different signals on N different antennas. These signals are received on M different receiving antennas. This system relies on the different signals spatial characteristics to provide separation. It does not solve the problem of increasing the data rate of a channel to a small hand-held receiver. The performance of the "BLAST" system is known to depend on N and M being generally greater than 1 with optimums being around 5-15 and with very sophisticated signal processing at the M receivers and the combiner. The "BLAST" system, as proposed, uses a single spreading code on all channels (See Huang and Viswanathan, "Multiple Antennas in Cellular CDMA Systems: Transmission, Detection, and Spectral Efficiency", IEEE Transactions on Wireless Communications, Vol. 1, No. 3, July 2002).

It is desirable to have a method and apparatus to transmit different information on different multipath components between a transmitting station and a receiving station where the receiving station can be a small hand-held unit with a single omni-directional antenna (such as a cellular telephone would have). By carefully choosing which multipath components to use between two stations, such a system could multiply the amount of data transmitted in a given period of time thereby increasing the throughput to a very small receiver while simultaneously avoiding the problem of multipath fading.

SUMMARY OF THE INVENTION

The present invention relates to a method for increasing transmission rate in a wireless communication system by selecting a set of multipath components between a transmitting location and a receiving location with each multipath component characterized by a different departure angle at the transmitting location, and by the transmission of different messages on each of the selected multipath components from the transmitting location to the receiving location. The multipath components are normally received at the receiving station with an non-selective antenna, and the different information is separated from each of the selected multipath components. The transmitting station can be a cellular telephone base-station, and the receiving station can be a cellular telephone.

The messages on each of the multipath components can be coded with a different signature so that each signal can be separated from the others. Each of the different messages can be coded by a different offset of a pseudo-noise (PN) code, a completely different PN code, a different member of an orthogonal signalling set or by any other means or method that allows the components to be separated.

The transmitting station can send information on the selected multipath components either continuously, intermittently or burst by burst. In a burst by burst mode, the bursts optionally can be modulated by adaptive quadrature amplitude modulation (AQAM) with different bursts possibly modulated by different QAM complexities.

The set of selected multipath components can be chosen by channel probing or mapping either statically or dynamically. Mapping can be accomplished by any mapping method. A preferred method is to have the receiving station transmit a burst of known data from an omni-directional antenna. The transmitting station can receive this burst with a searching "smart antenna" and thus map out possible paths. An algorithm can choose a usable subset of paths according to pre-determined criteria.

DETAILED DESCRIPTION

Figure 1:
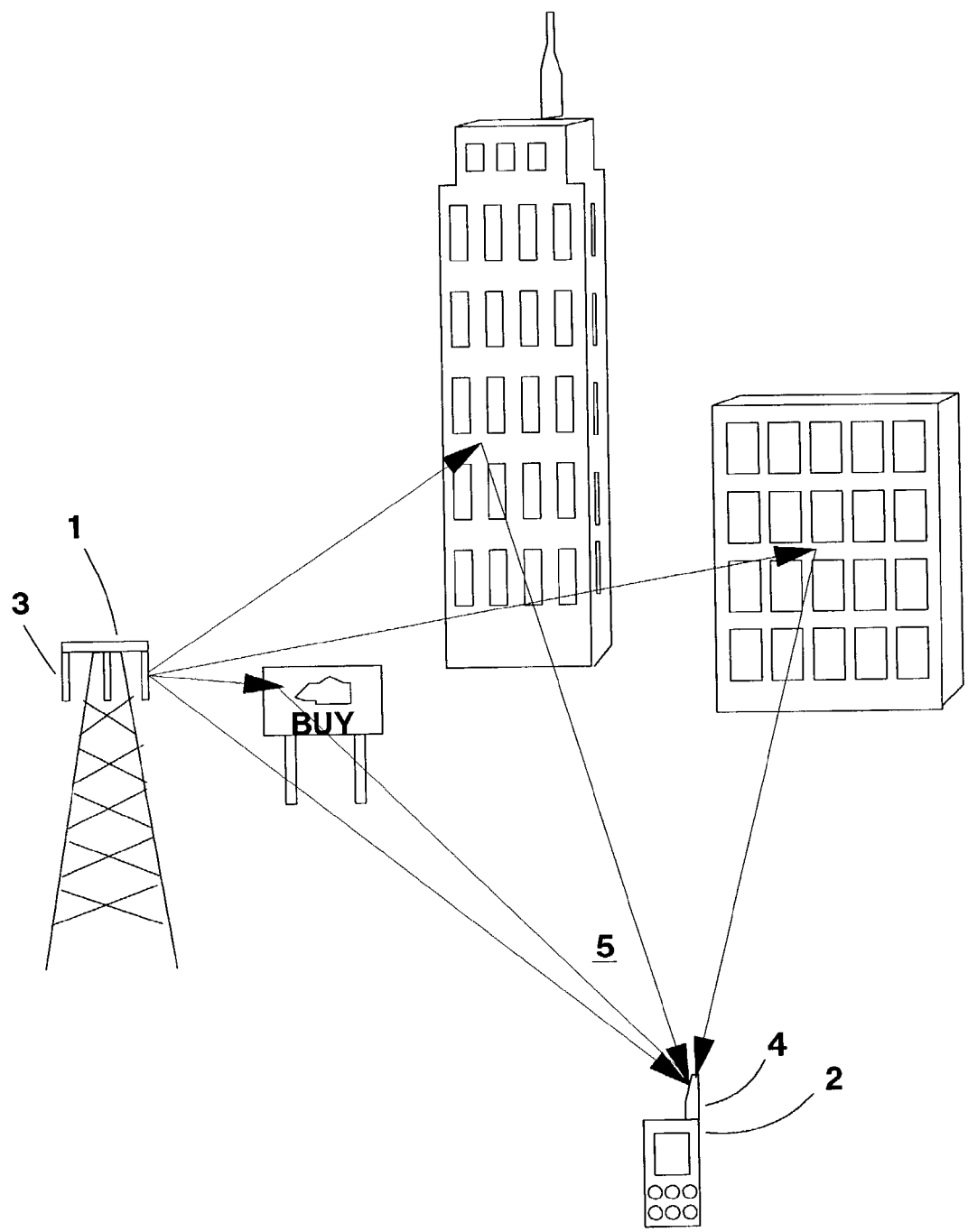
FIG. 1 shows the system of the present invention, including multipath components transmitted by a transmitting station, reflected by various structures, and received by a receiving station.

The present invention relates to transmitting different information on different multipath components that exist between a transmitting station and a receiving station, while not requiring the receiving station to have a sophisticated antenna. The invention can be dynamic in that it can very quickly change the set of multipath components being used in a fast burst mode environment (such as in typical burst code or time division multiple access system CDMA or TDMA). FIG. 1 shows a diagram of such a system with a transmitting station 1 and a receiving station 2.

A "smart" transmitting antenna 3, or set of antennas, can be used at a base-station (which can be a cellular telephone base-station) to selectively transmit different information in different angular directions that have been mapped as multi-path components 5 to the desired receiver 2 (which can be a cellular telephone). Usually the receiver 2 contains an omni-directional antenna 4. The transmissions can optionally be delayed to prevent phase cancellation; however, this is not required if the set of chosen multipaths do not contain any pair-wise 180 degree phase cancellations.

This capability can be provided by the present invention by mapping the channel either statically or dynamically, or by pre-mapping. In the case of moving receivers (such as mobile phones in vehicles), there may also be significant doppler phase and frequency shift in each multipath component. Dynamic burst channel mapping can record these effects in addition to multipath angles on the fly for each burst or for groups of bursts in dynamic systems.

Figure 2:
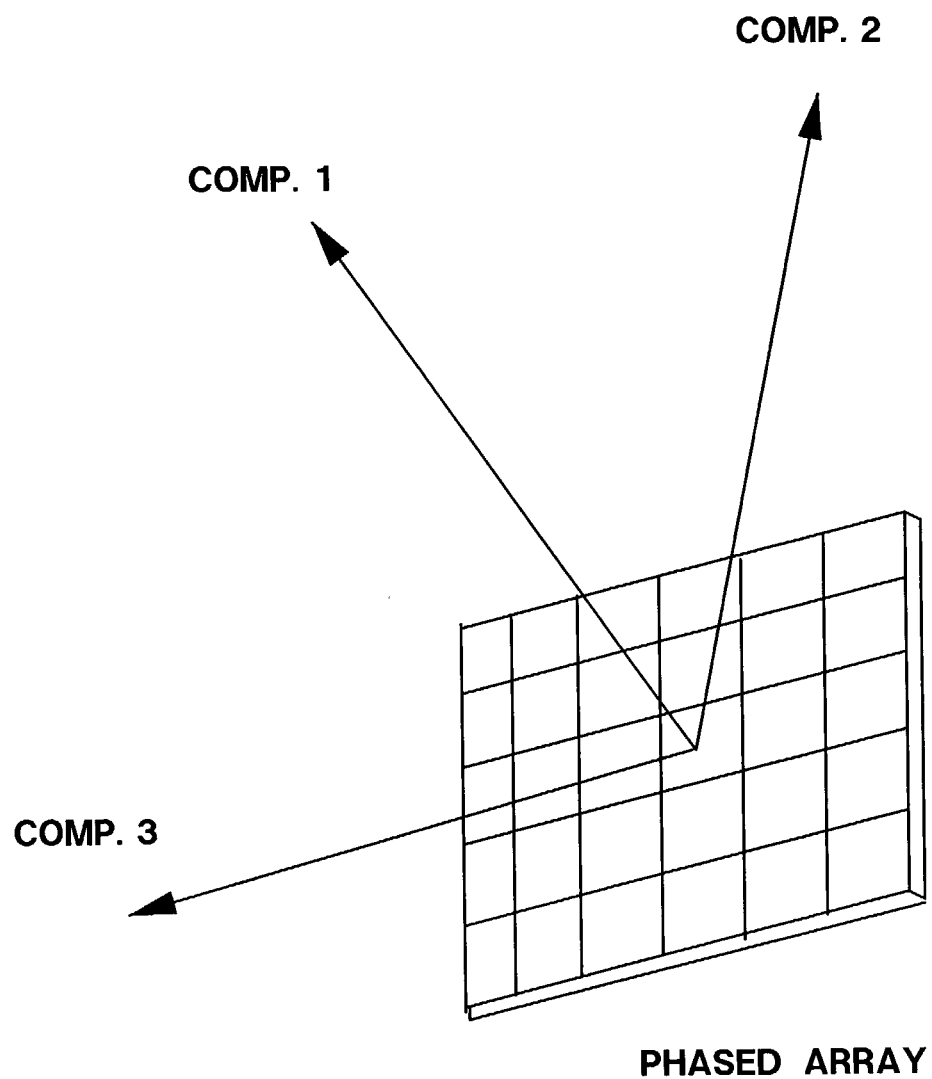
FIG. 2 shows a transmitting antenna using different angles of departure to select multipath components.

FIG. 2 shows a transmitting station antenna using different angles of departure (arrival) for different multipath components. The receiving station, which can include an omni-directional antenna can sum (linearly combine) all signals from all the incoming paths (all multipath components). Therefore, there must exist some way at the receiver to separate the summed signals belonging to each multipath. The preferred method is to use approximately the same carrier or channel frequency for each multipath component; however, this is not required, and different frequencies can be used for different multipath components. Also, it is preferred in burst systems to transmit on each multipath component at the same time; however, again, this is not required by the present invention, and bursts on different multipath components can occur at different times.

Figure 3A:
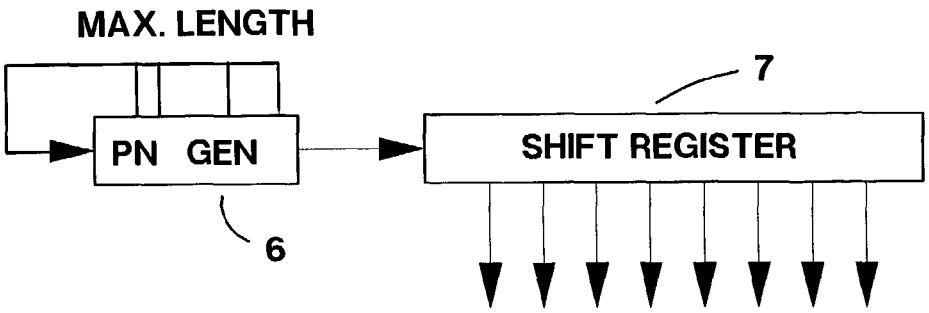
FIG. 3A shows coding with offset PN sequences.

In general, some form of separable signature must be given to the signal arriving from each multipath component. Each multipath component can be coded for transmission with a different coded signature for identification. This coding can be done in many different ways including the use of PN coding, othogonal signal sets, linear combinations of orthogonal basis functions, time division coding, and other ways. The preferred method is to use offset PN codes or orthogonal signal sets (which can be linear combinations of orthogonal basis functions). One well known set of orthogonal functions are the Walsh functions commonly used in CDMA systems. FIG. 3A shows the use of offset PN coding while FIG. 3B shows the use of an othogonal code set.

The technique of FIG. 3A is to connect the output of a maximal length PN shift register or generator into a shift register to provide the desired offset for coding each multipath component.

Figure 3B:
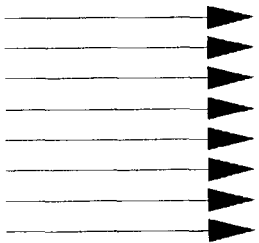
FIG. 3B shows coding with orthogonal sequences.

The technique of FIG. 3B looks up othogonal codewords from a table for each multipath component. Because it is fairly easy to generate orthogonal code sets of 16, 32 and 64 members (rows in the table), and because there are usually less usable multipath components than this, it is preferred to use an othogonal code set containing a small number of members; however, othogonal codes sets of any length are within the scope of the present invention. In general, when an othogonal code is used, it is used as a spreading signal for direct spreading.

While direct spreading has been discussed, it is within the scope of the present invention to use frequency hopping and time and frequency multiplexing, a combination of direct spreading and frequency hopping, random time intervals based on a PN code or othogonal signal set, frequency or channel allocation based on a signature technique, or any other method or means to provide a separable signature to the signal transmitted on each of the usable multipath components.

Figure 3C:
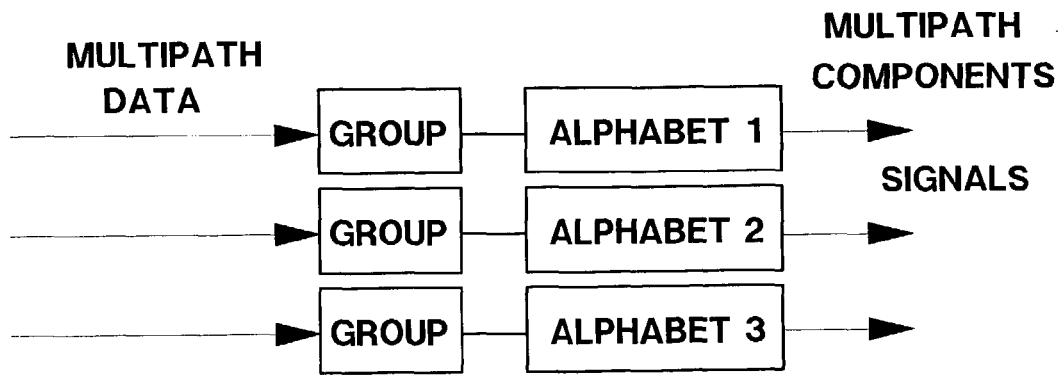
FIG. 3C shows coding using an orthogonal alphabet.

The techniques of FIGS. 3A and 3B, directly spread the data signal at rate R with a PN or othogonal spreading code by methods known in the art to produce a spread spectrum signal. It is also possible to use othogonal modulation symbols instead of direct spreading. FIG. 3C shows the use of an othogonal pre-modulation alphabet. In this case, each group of n incoming data bits (representing data to be transmitted on different multipath components) is pre-modulated or spread by converting each group into a single member of an othogonal alphabet. For example, groups of four bits can be used to choose members of a alphabet of 16 members (five bits would choose from an alphabet of 32 members). Because each othogonal symbol generally comprises many binary bits per symbol (a larger number than the group length), the effect is a transmission rate increase similar to direct spreading. Of course, the othogonal symbols can be directly mapped into trellis modulation techniques as is known in the art. In the present invention, symbols from different othogonal alphabets must be transmitted on each usable multipath component.

This requires a number of othogonal alphabets (where symbols from one alphabet are mutually othogonal to symbols from the other alphabets). Therefore, the preferred method is to use direct spreading with either an offset PN code or different repeated symbols from an othogonal alphabet rather than modulation with othogonal alphabets or trellis coding.

The scope of the present invention includes wideband as well as narrow-band communication of all types of data, channel and modulation coding as well as all types of access methods. In particular the present inventions includes code division multiple access (CDMA), time division multiple access (TDMA) and frequency division multiple access (FDMA) techniques such as orthogonal frequency division multiplexing (OFDM) as well as combinations of these. However, any type of modulation or access method is within the scope of the present invention. Also any type of antenna can be used at the receiving station, an omnidirectional short whip being preferred.

The present invention assumes static or dynamic mapping of the channel to identify usable mutipath components. One possible way of doing this mapping is to allow the receiving station to transmit a burst of known data back to the transmitting station using an omni-directional antenna (at the receiving station).

Figure 4:
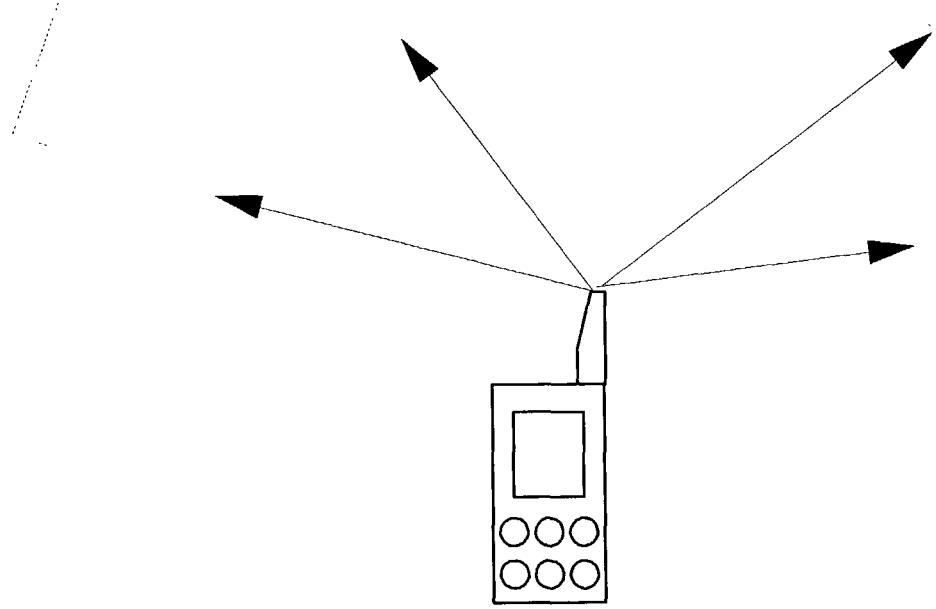
FIG. 4 shows a particular channel mapping method.

FIG. 4 shows a channel mapping scheme based on this type of reverse transmission. Such a reverse transmission causes the same signal to traverse each possible multipath component along the route. The transmitting station can then characterize each possible multipath component as to angle of arrival, time delay, phase shift, frequency shift, and other parameters. The transmitting station can then choose from the set of all the possible multipaths a subset of usable ones upon which it can use for data communications. This mapping can be static (done once before communication begins), or dynamic (done burst by burst) where the set of used paths can be changed dynamically.

In general, usable paths can be characterized by being separated enough in angle of departure/arrival that a directional transmit antenna can place different data on each path separately (this can be done at the simultaneously or sequentially with a multi-beam "smart" antenna or with multiple antennas). The separation can be measured in terms of isolation and this can be measured in dB. A typical isolation between paths could be around 15-20 dB. However, this number depends on the directivity of the transmit antenna, and the response of each path (attenuation along different paths may be different), and the robustness of the separation technique.

Figure 5:
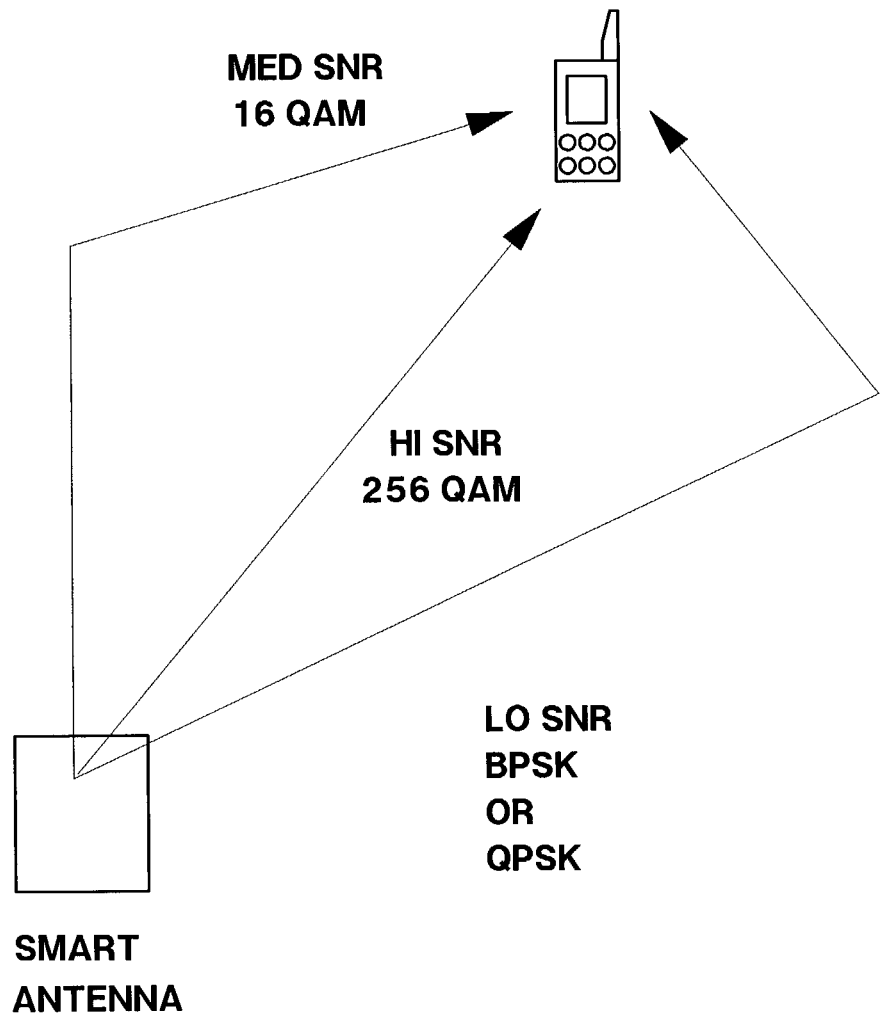
FIG. 5 shows burst-by-burst AQAM modulation using different AQAM complexities on different multipath components.

In burst-to-burst dynamic systems, additional advantage can optionally be taken of different signal to noise ratios on different paths by using adaptive modulation techniques such as adaptive quadrature amplitude modulation (AQAM) and the like. It is within the scope of the present invention to use different modulation complexities dynamically on different multipaths. For example, if dynamic mapping shows a better signal to noise ratio on one of the paths during a particular pulse period, 64 QAM could be used on that path while 16 QAM or BPSK could be used on another path with a worse signal to noise ratio. Such signal to noise relationships can be statically determined or dynamically determined on a burst-by-burst basis. Of course, the receiver must be able to separate the signals on the different paths enough to properly demodulate them to some target bit error rate (BER) after they have been summed. FIG. 5 shows the use of burst-by-burst AQAM using different QAM complexities on different multipath components.

It is known that error correcting and detection codes can be used to improve BER on communication channels. It is within the scope of the present invention to use different error correction or detection codes on different multipath components. Such choices would normally be based on either signal to noise ratio or measured BER.

In the case of adaptive modulation with different modulation and/or different error coding on different multipath routes, the receiver must also be able to correctly decide the modulation type and the code on each path. This can be accomplished through blind or coded demodulation techniques known in the art for the modulation and by hard or soft code identification techniques also known in the art.

Figure 6:
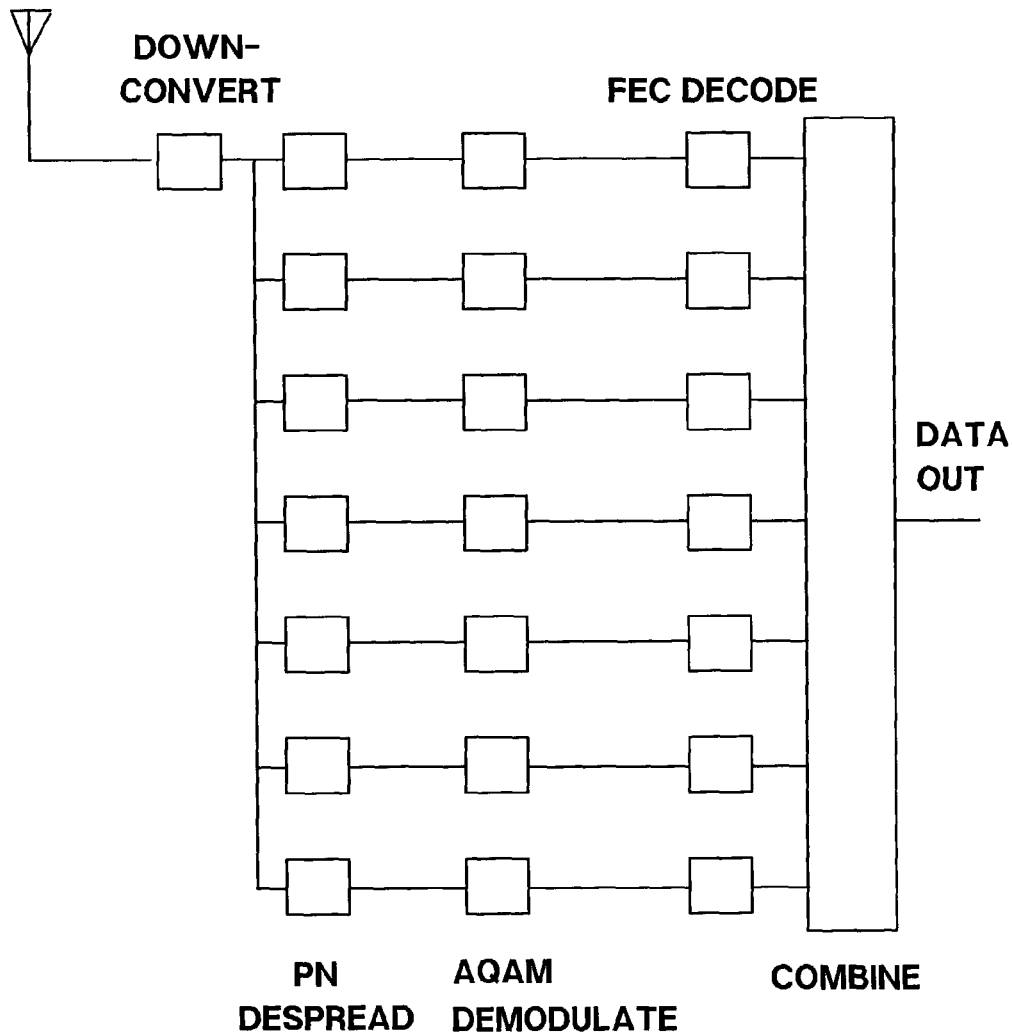
FIG. 6 shows an example receiver block diagram for possible embodiment of the present invention.

FIG. 6 shows a block diagram of a possible receiver for a system that uses offset PN direct spreading on different multipath components as well as AQAM modulation based on reverse pulse channel mapping. The receiver in FIG. 6 assumes that an initial or master mapping is made at the beginning of transmission, and that N multipath components are chosen. Then every M bursts a dynamic reverse mapping is made; however, this dynamic mapping may change the chosen set of multipath components, or can be used only to dynamically characterize each multipath component in terms of signal to noise ratio and BER. If the set of multipath components changes, a means (not shown in FIG. 6) must be provided to communicate each new mapping to the receiver.

The receiver allocates N decoding channels and locks different offsets of the known PN code to each channel. The transmitting station transmits AQAM signals based on the signal to noise ration on each multipath component. Each multipath component can have a different AQAM complexity. In addition, an identical forward error correcting code is used on each channel to improve the BER. When transmission first starts, the modulation can be set to use BPSK for the most robust demodulation in order to establish base-line BERs for each multipath component. Detection can be by matched filter (MF), minimum mean-squared error (MMSE), non-coherent, or by any other known detection technique.

The receiver of FIG. 6 shows PN de-spreading taking place before baseband QAM demodulation. This is possible if the de-spreading code is conditioned to the proper levels for the expected modulation complexity. In the case of a single modulation being transmitted, de-spreading would take place after demodulation.

After every M bursts from the transmitting station, the receiver transmits a reverse mapping burst with its omni-directional antenna. This burst can contain a fixed field that is normally always the same that can be used by the transmitting station to re-evaluate the current multipath allocation choice and to adjust phase offset to avoid nulling, and a message field where the current BER for each multipath component is reported and a new AQAM code can be requested for that multipath component. The AQAM code can then be used for the next M bursts without change. This technique avoids the receiver needing to use blind demodulation (of course blind demodulation is within the scope of the present invention). Other optional fields can report cases where the receiver is unable to decode, demodulate or lock onto certain of the multipath components or to request repeat transmissions of certain data or packets from a higher protocol layer (such as a MAC layer known in the art).

It should be remembered that the receiver and techniques illustrated in FIG. 6 are an embodiment of the present invention and are for example only. FIG. 6 represents only one of numerous possible receivers or systems that are within the scope of the present invention. In particular, the use of signature techniques, modulation, coding and mapping can all be varied. In general, any adaptive or static technique that transmits different data on multipath components to a receiver that contains an antenna that combines these components is within the scope of the present invention. It should also be noted, that any receiver used in actual practice will most probably contain additional circuitry such as phase-locked loops, automatic gain control, analog to digital converters and other circuits known in the art but not depicted in FIG. 6.

The present invention has been disclosed using various descriptions and illustrations. It will be apparent to one skilled in that art that many variations and changes are within the scope of the invention. The examples and illustrations have been presented as embodiments of the invention for the purpose of explaining the invention. The invention is determined by the claims presented herein and not the examples and illustrations presented.

What is claimed is:

1. A method for increasing transmission rate in a wireless communication system between a transmitting station and a receiving station comprising the steps of:
    selecting a set of multipath components between a single transmitting antenna and a single receiving antenna, each multipath component characterized by a different transmission path from said transmitting antenna to said receiving antenna;
    transmitting different messages, each with different data content, on each of said selected multipath components from said single transmitting antenna to said single receiving antenna;
    receiving each of said multipath components at said receiving station with a non-selective antenna;
    separating different data content from each of said selected multipath components at said receiving station.

2. The method of claim 1 further comprising the steps of:
    coding each of said different messages at said transmitting station;
    decoding each of said different messages at said receiving station.

3. The method of claim 2 wherein each of said different messages is coded by a different code.

4. The method of claim 2 wherein each of said different messages is coded by either of a different PN code or a different offset of a PN code.

5. The method of claim 1 wherein said non-selective antenna is a mobile telephone antenna.

6. The method of claim 2 wherein each of said different messages is coded by a member of an orthogonal signaling set.

7. The method of claim 1 wherein said messages are packetized into discrete packets.

8. The method of claim 7 wherein different packets are transmitted on each of said selected multipath components.

9. The method of claim 1 wherein said set of selected multipath components is chosen by channel probing.

10. The method of claim 1 wherein a message on at least one of said selected multipath components is transmitted burst by burst.

11. The method of claim 10 wherein said bursts are modulated by adaptive quadrature amplitude modulation (AQAM).

12. A wireless transmission system for transmitting information from a single transmitting antenna to a single receiving antenna, said system comprising:
    a transmitter at a transmitting station electrically coupled to a single transmitting antenna, said transmitter sending different information, including different data streams, on each path of a set of selected multipath components between said single transmitting antenna and said single receiving antenna;
    a receiver at a receiving station electrically coupled to said single receiving antenna, said receiver receiving and separating said different data streams from said multipath components.

13. The wireless transmission system of claim 12 wherein said transmitter codes said information carried by said multipath components.

14. The wireless transmission system of claim 13 wherein said transmitter codes each of said multipath components with a different offset of a PN code.

15. The wireless transmission system of claim 13 wherein said transmitter codes each of said multipath components with a member of an orthogonal signaling set.

16. The wireless transmission system of claim 12 wherein said transmitting stations sends said information on said selected multipath components burst by burst.

17. The wireless transmission system of claim 16 wherein said bursts are modulated by adaptive quadrature amplitude modulation (AQAM).

18. A high speed wireless data communication system comprising, in combination:
    means for selecting a set of multipath components between a single transmit antenna and a single receive antenna, each of said selected multipath components having a different departure angle at said transmit antenna;
    means for sending different data streams on each of said selected multipath components, and is associated with said transmitting antenna;
    means for receiving each of said selected multipath components and separating said different data streams, and associated with said receiving antenna, wherein said receiving antenna is a non-selective antenna.

19. The high speed wireless data communication system of claim 18 wherein said data on each of said multipath components is coded.

20. The high speed wireless data communication system of claim 19 wherein each of said multipath components is coded with a different offset of a PN code.

21. The high speed wireless data communication system of claim 19 wherein each of said multipath components is coded with a member of an orthogonal signal set.

22. The high speed wireless data communications system of claim 18 wherein each of said multipath components operates on a single predetermined frequency.

* * * * *